Sept. 8, 1970 R. R. HAWKINS ET AL 3,527,965

VELOCITY OF MOVEMENT MONITOR

Filed June 6, 1968

INVENTORS
ROYAL R. HAWKINS
RICHARD K. HEISER

BY Francis A. Sirr

ATTORNEY.

3,527,965
VELOCITY OF MOVEMENT MONITOR

Royal R. Hawkins, Bloomington, and Richard K. Heiser, Edina, Minn., assignors to Honeywell Inc., Minneapolis, Minn., a corporation of Delaware Filed June 6, 1968, Ser. No. 734,981
Int. Cl. G01p *3/44*
U.S. Cl. 307—308 10 Claims

ABSTRACT OF THE DISCLOSURE

A motive source is coupled to a shaft through a clutch. A capacitor is charged to a voltage whose magnitude is inversely related to shaft speed, the capacitor being connected to a programmable unijunction transistor in a manner to render the unijunction transistor conductive when the shaft speed is too low. A transistor controlled voltage source is diode coupled to the capacitor, and the transistor is controlled from the clutch in a manner to forward bias the diode and clamp the capacitor to a voltage below that necessary to fire the unijunction transistor when the clutch is disengaged and for a time period after initial clutch engagement while the shaft is coming up to speed. After this time period, the diode is back-biased and the capacitor charge is related to shaft speed. A holding voltage source maintains the unijunction transistor conductive once a slow shaft speed is sensed, and a manual switch resets the unijunction transistor to the nonconductive state.

BACKGROUND OF THE INVENTION

Prior art monitors provide an output when the rate of repetitive input pulses drops below a given rate, wherein a capacitor is maintained at a low level of charge so long as the pulse rate is above this given rate, and wherein a unijunction transistor fires when the pulse rate drops below this given rate. U.S. Pat. 3,315,246 to J. P. Huffman et al. is an example of such prior art.

U.S. Pat. 3,214,698 to M. G. Chesnut discloses a control circuit for controlling both overspeed and underspeed conditions of a prime mover, wherein a magnetic pickup may be coupled to a shaft of the prime mover to develop a signal having a predetermined number of pulses per shaft revolution. A time-delay circuit is provided to allow the prime mover to come up to speed before the control circuit is energized.

SUMMARY OF THE INVENTION

Our invention relates to a monitor for use with a shaft, or member, which is coupled to a prime mover by means of a clutch, the monitor providing an output when the shaft rotation rate, or velocity of physical movement, drops to a low level, wherein the monitor is rendered insensitive to sense rate of rotation when the clutch is disengaged, and is also maintained insensitive for a time period after the clutch is initially engaged while the shaft is coming up to speed .

More specifically, we utilize a unique and simple circuit configuration which includes a voltage responsive device in the form of a diode which is used to clamp a capacitor to a low voltage when the clutch is disengaged and while the shaft is coming up to speed. Thereafter, the diode is back-biased and the capacitor charge is allowed to be a function of shaft speed.

The capacitor state of charge varies inversely with shaft speed—the slower the speed the higher the capacitor voltage. A unijunction transistor fires when the capacitor voltage gets too high. With the clutch disengaged, a forward biased diode and controllable impedance network including a transistor switch clamps the capacitor voltage to a level below that which will fire the unijunction transistor. When the clutch is first engaged, the transistor switch and a time delay means function after a time delay to back bias the diode, thereby allowing the capacitor to charge to a voltage which is related to shaft speed. If a low speed is sensed, the unijunction transistor is thereafter maintained conductive by means of a second diode which couples the capacitor to a low voltage source. A manual switch is provided to reset the unijunction transistor to its nonconductive state.

DESCRIPTION OF THE PREFERRED EMBODIMENT

Figures 1, 2:
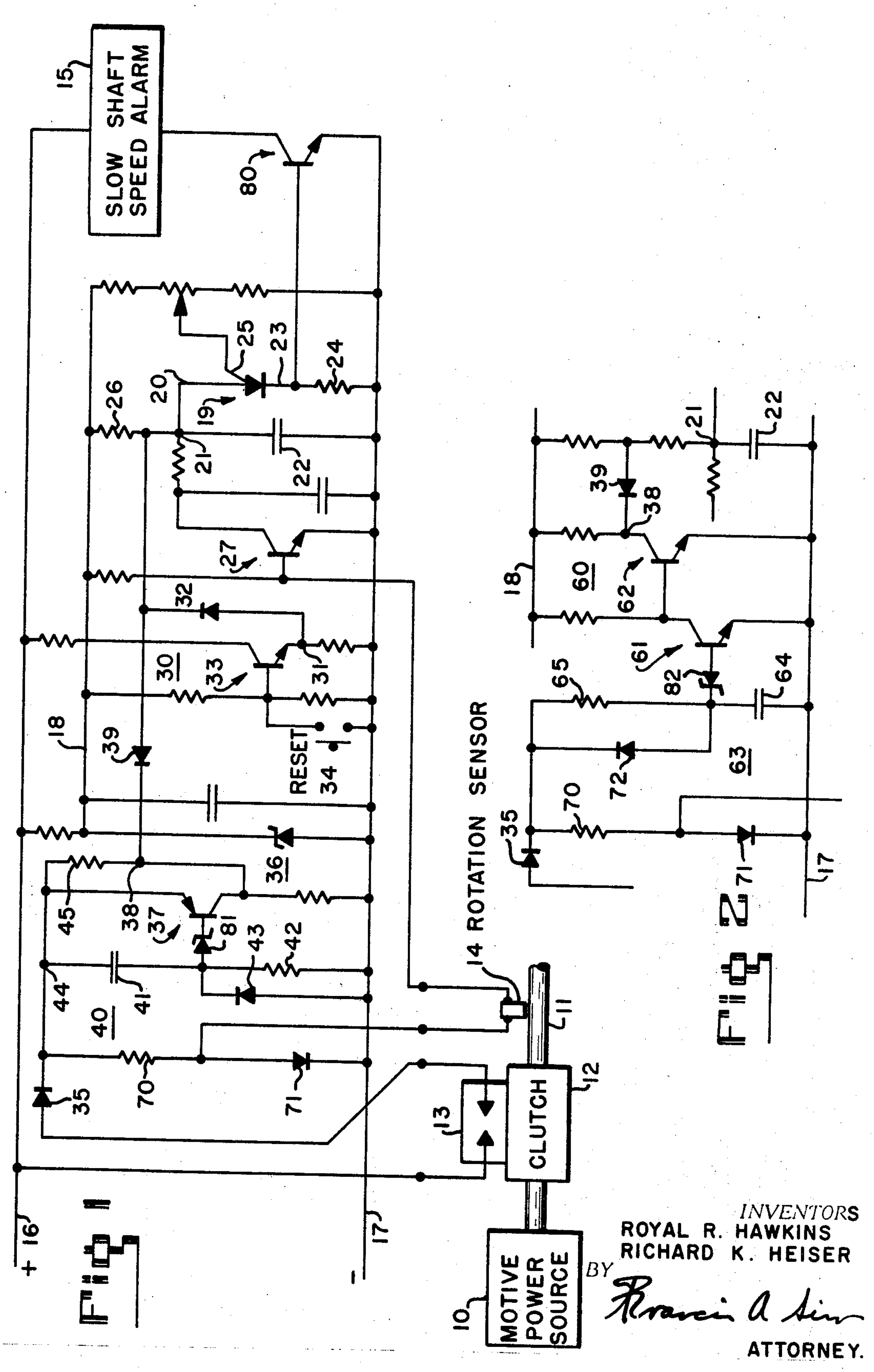
FIG. 1 is a schematic showing of a preferred embodiment of our invention, showing its connection to a clutch-shaft structure and to a rotation sensor.
FIG. 2 is a modification of FIG. 1 wherein the controllable impedance network and time delay means are modified.

Referring to FIG. 1, motive power source 10 is connected to shaft 11 through clutch 12. Associated with clutch 12 is a normally open switch 13, this switch being adapted to close when the clutch is engaged to connect motive power source 10 to shaft 11. Rotation sensor 14 is associated with shaft 11 to provide a signal in the form of a predetermined number of pulses per shaft revolution, the frequency of these pulses being directly related to the speed of the shaft. This sensor may, for example, be a magnetic pickup associated with gear teeth formed around the circumference of the shaft.

The rate of rotation monitor of our invention is adapted to be connected to switch 13 and to sensor 14 to provide a low shaft speed output, for example by means of alarm 15.

Operating voltage for the monitor is provided at conductors 16 and 17, conductor 16 being approximately 12 volts positive.

A Zener diode, resistor and capacitor are connected across conductors 16 and 17 to establish a positive voltage at conductor 18 of approximately 10 volts.

A programmable unijunction transistor 19, as described in Application Note 90.70 of the General Electric Company, constitutes a voltage sensitive output means having an anode 20 connected to a terminal 21 of capacitor 22 and having a cathode 23 connected by means of resistor 24 to conductor 17. Gate 25 is connected to a voltage divider network connected between conductors 17 and 18. As the anode voltage of unijunction transistor 19 is raised above the intrinsic standoff point, as established by the potential level of gate electrode 25, anode-to-cathode current begins to flow and a voltage is developed across resistor 24. Unijunction transistor 19 exhibits a negative resistance characteristic and is maintained in a conductive condition so long as a minimum anode current continues to flow. When the anode current reduces to a value below this minimum, the unijunction transistor switches back to its nonconductive state.

By way of example, a structure utilizing our invention causes unijunction transistor 19 to become conductive when capacitor terminal 21 rises to 6½ volt positive. The unijunction transistor extinguishes when the voltage at terminal 21 lowers to below 2 volts, although the turn-off of the unijunction transistor is a function of anode current.

So long as unijunction transistor 19 remains conductive, transistor 80 is conductive and alarm 15 is energized.

Resistor-capacitor circuit means 22, 26 controls unijunction transistor 19. Capacitor 22 is adapted to be charged from positive conductor 18 through resistor 26. Were it not for the operation of other circuit components, capacitor terminal 21 would seek a voltage sufficiently high to fire unijunction transistor 19.

Sensor 14 is however connected to the base electrode of transistor 27 and transistor 27 is cyclically rendered conductive and then nonconductive at a rate determined by the rate of rotation of shaft 11—the faster the rate of rotation, the higher the switching frequency of transistor 27. So long as transistor 27 continues to cycle between the conductive and nonconductive states at a sufficiently high rate capacitor 22 is maintained in a low state of charge and unijunction transistor 19 does not fire. However, should the rate of rotation of shaft 11 drop, capacitor 22 then charges to a sufficiently high voltage to cause unijunction transistor 19 to fire.

Once unijunction transistor 19 is fired, its anode current is maintained by means of a holding voltage source network 30. Output voltage point 31 of this network provides a potential of approximately 4 volts positive which is connected to capacitor terminal 21 by diode 32. The potential level of terminal 31 is established by normally conducting transistor 33.

The potential level at terminal 31, as coupled to capacitor terminal 21 by means of diode 32, is insufficient to cause firing of unijunction transistor 19 but supplies sufficient anode current to maintain the unijunction transistor conductive once it is rendered conductive by a low shaft speed condition.

A manual reset switch 34 may be actuated to render transistor 33 nonconductive and thereby render unijunction transistor 19 nonconductive.

As has been mentioned, switch 13 associated with clutch 12 is in an open condition when the clutch is deenergized. With switch 13 open, diode 35 is disconnected from positive conductor 16. Diode 35 is associated with controllable impedance network 36. This controllable impedance network includes a switchable circuit element in the form of transistor 37 and includes a network terminal 38. With switch 13 open, transistor 37 is nonconductive and the potential level of terminal 38 is at approximately the potential level of conductor 17.

Terminal 38 is connected to capacitor terminal 21 by means of diode 39. So long as transistor 37 is nonconductive, diode 39 is forward biased and the potential level of capacitor terminal 21 is clamped to the relatively low potential level of terminal 38.

This potential level is selected such that, so long as terminal 21 is clamped in this fashion, unijunction transistor 19 cannot fire. The closing of switch 13 connects diode 35 to positive conductor 16 and is effective to energize time delay means 40. This time delay means includes capacitor 41 and resistor 42. Capacitor 41 begins to charge, its accumulated voltage being applied to Zener diode 81 and transistor 37. After a given time delay, the accumulated voltage on capacitor 41 has increased to where Zener diode 81 conducts and transistor 37 is rendered conductive. Conduction of this transistor shorts resistor 45 and effectively connects terminal 38 through diode 35 and switch 13 to positive conductor 16. In this state, diode 39 is back biased and the voltage at capacitor terminal 21 may now increase, seeking the 10-volt level of conductor 18.

Thus, diode 39 in the forward biased condition with switch 13 open is effective to maintain unijunction transistor 19 inoperative to sense a low shaft speed condition. When the clutch is first engaged, time delay means 40 functions to remove the forward bias from diode 39 and to back bias the diode, but only after a time delay. After this time delay period, unijunction transistor 19 is operative to sense a low speed condition of shaft 11, if one should occur.

FIG. 2 discloses a modification of FIG 1 wherein the controllable impedance network and the time delay means are modified.

Controllable impedance network 60 includes network terminal 38 and a switchable circuit element comprising transistors 61 and 62. With the clutch disengaged, the switch 13 thus in an open condition, diode 35 is disconnected from positive conductor 16, transistor 61 is nonconductive and transistor 62 is conductive. With transistor 62 conductive, network terminal 38 is connected to approximately the potential level of conductor 17 and diode 39 is forward biased to clamp capacitor terminal 21 to a low potential level, below a potential level sufficient to fire unijunction transistor 19.

When the clutch is engaged, and switch 13 is closed, time delay means 63 begins its timing period. Capacitor 64 charges through resistor 65 and, after a given time period transistor 61 is rendered conductive. Conduction of this transistor renders transistor 62 nonconductive. Network terminal 38 is now connected to approximately the potential level of positive conductor 18. Diode 39 is back-biased and capacitor terminal 21 may now seek the potential level of conductor 18, as controlled by sensor 14 and transistor 27.

It will be remembered that after the initial timing period of the time delay means 40 of FIG. 1 and the time delay means 63 of FIG. 2, the respective capacitors 41 and 64 are charged to a point where all charging current flows through the Zener diodes 81 and 82 and respective transistors 37 and 61.

The embodiments of the invention in which an exclusive property or right is claimed are defined as follows:

1. In a monitor for use in monitoring the velocity of a physical movement whose occurrence is subject to control to provide an output when the velocity drops to a low level; the monitor having, voltage sensitive output means sensitive to a given voltage magnitude, circuit means including a capacitor connected to a source of voltage to charge a terminal in controlling relation to said output means, to establish a capacitor voltage charge whose magnitude varies inversely with the velocity of movement, and means adapted to maintain said capacitor terminal charge below said given voltage so long as the velocity of movement is above the low level; the improvement comprising;

a controllable impedance network including, a switchable circuit element having a first and a second state, and a network terminal whose voltage magnitude is below said given voltage when said circuit element is in said first state and whose magnitude is above said given voltage when said circuit element is in said second state, a voltage responsive device connected between said capacitor terminal and said network terminal in a manner to be nonconductive when said circuit element is in said second state, and means to control said circuit element from said first to said second state upon initial occurrence of the physical movement.

2. A monitor as defined in claim 1 for use in monitoring the rate of movement of a member, which member is adapted to be selectively connected to a motive power source, wherein at least named means is a time delay means to control said circuit element from said first to said second state with a time delay upon initial connection of the member to the motive power source.

3. A monitor as defined in claim 1 wherein said voltage sensitive output means is a device which initially conducts at said given voltage magnitude and thereafter is maintained conductive by a minimum current flow, and including a holding voltage source network including a point of a finite voltage magnitude below said given voltage, said point being connected to said capacitor terminal to maintain said voltage sensitive output means conductive.

4. A monitor as defined in claim 3 including means connected to said holding voltage source network and operable to reduce the voltage magnitude of said point and render said voltage sensitive output means nonconductive.

5. A monitor as defined in claim 1 wherein said voltage sensitive output means is a device having an electrode, said device being rendered conductive when the electrode voltage reaches said given positive magnitude; wherein said capacitor terminal is connected to said electrode; wherein said voltage responsive device is a diode, the anode of said diode being connected to said capacitor terminal and the cathode of said diode being connected to said network terminal.

6. A monitor as defined in claim 5 wherein the electrode of said voltage sensitive output means is an anode and wherein said voltage sensitive output means is maintained conductive by a minimum anode current flow; wherein the voltage at said network terminal is positive; and including a holding voltage source network having a positive output voltage point whose magnitude is below said given magnitude, and a second diode whose anode is connected to said output voltage point and whose cathode is connected to said capacitor terminal to maintain said voltage sensitive output means conductive.

7. A monitor as defined in claim 2 wherein said time delay means includes a second capacitor which is charged over a given time period upon initial connection of the member to the motive means, said second capacitor being connected in controlling relation to said circuit element to cause said circuit element to charge from said first to said second state at the end of said time period, and including circuit means to quickly discharge said second capacitor when the member is disconnected from the motive means.

8. A monitor as defined in claim 1 wherein said voltage sensitive output means is a programmable unijunction transistor, wherein said capacitor terminal is connected to the anode of said transistor; wherein said voltage responsive device is a diode; wherein said network terminal is positive and said diode has its anode connected to said capacitor terminal and its cathode connected to said network terminal; and including a holding voltage source network having a positive output voltage point of a magnitude below said given magnitude, and a second diode whose anode is connected to said output voltage point and whose cathode is connected to said capacitor terminal to maintain said transistor conductive once it is rendered conductive by the low level velocity of movement.

9. A monitor as defined in claim 8 including manual means connected to said holding voltage source network and operable to reduce the voltage magnitude of said output voltage point and render said transistor nonconductive.

10. A monitor as defined in claim 5 for use in monitoring the rate of movement of a member, which member is adapted to be selectively connected to a motive power source, wherein said means to control said circuit element from said first to said second state upon initial connection of the member to the motive power source is a time delay means to control said circuit element from said first to said second state with a time delay.

References Cited

UNITED STATES PATENTS

| | | | |
|---|---|---|---|
| 3,181,009 | 4/1965 | Felchek | 307—274 XR |
| 3,210,658 | 10/1965 | Stevens | 340—271 XR |
| 3,465,326 | 9/1969 | Weir et al. | 340—263 |

OTHER REFERENCES

G.E. Application Note 60.20, titled, "Programmable Unijunction Transistor," dated November 1967.

STANLEY T. KRAWCZEWICZ, Primary Examiner

U.S. Cl. X.R.

307—233, 295, 305; 324—70; 328—1, 140; 340—263, 271